Nov. 29, 1966  G. D. SHERMAN ETAL  3,288,310
VEHICULAR TYPE PIPE UNLOADER

Filed Dec. 30, 1964  4 Sheets-Sheet 4

United States Patent Office 3,288,310
Patented Nov. 29, 1966

3,288,310
VEHICULAR TYPE PIPE UNLOADER
George D. Sherman and Raymond E. Winders, both of Houma, La., assignors to Texaco Inc., New York, N.Y., a corporation of Delaware
Filed Dec. 30, 1964, Ser. No. 422,194
6 Claims. (Cl. 214—1)

This invention concerns a mobile type of pipe unloading apparatus. More specifically, the invention relates to a vehicle mounted pipe unloading apparatus that is particularly adapted for use in unloading lengths of pipe from a variable height, e.g., that involved in unloading a barge containing such pipe on to a rack or other receptable located near the dock.

The problem of unloading lengths of pipe, particularly in oil field operations, where such pipe must be unloaded from a barge so that there is involved a substantial vertical lift to move the pipe sections from the barge to the shore adjacent thereto, involves considerable difficulty. Oil field type lengths of pipe, are generally substantial in weight. This is particularly true if drill stem is involved, but also holds where casing type of pipes are involved. Consequently, the unloading of pipe from a barge to a warehouse or other facility located adjacent to dockage for the barge, is one that involves considerable difficulty and hard work to accomplish manually. Thus, the time involved may be greatly reduced along with less human effort, by making use of a pipe unloading apparatus according to the subject invention.

Accordingly, an object of this invention is to provide a vehicular type of unloading apparatus which may be moved conveniently from one location to another for different unloading operations.

Another object of the invention is to provide a pipe unloading apparatus that includes a vehicular mounting therefor and employs vertical lift means which is adjustable for various heights so as to accommodate different water levels, such as that caused by tides in connection with the location of a barge for example.

Briefly, the invention concerns a vehicular type pipe unloader for transferring lengths of pipe from a relatively low level to an elevated support therefor. Such unloader comprises in combination a framework mounted on a vehicular base for providing mobility to said unloader, and pipe lifting means carried by said framework and comprising a pair of spaced vertically movable support members. The combination also comprises a pair of pipe skids carried by said framework and cooperating with said pipe lifting means to receive said lengths of pipe from the top of the vertical movement of said lifting means.

Again briefly, the invention concerns a vehicular type pipe unloader for transferring lengths of pipe from a relatively low level, that is variable, to an elevated rack for receiving same. The invention comprises in combination a vehicle having wheels thereon and a framework mounted on said vehicle. It also comprises an engine carried by said framework, power transmitting means for connecting said engine to said wheels, and pipe lifting means carried by said framework. The pipe lifting means comprises a pair of upstanding guides supported from said framework, a pair of pipe supports traveling in said guides, and a pair of cables attached to said pipe supports for raising same in said guides. The pipe lifting means also comprises a plurality of pulleys for determining the paths of said cables, a pulley support for two of said pulleys, and hydraulic cylinder means for moving said pulley support to increase the path lengths for said cables and thus raise said pipe supports. The unloader also comprises a pair of pipe skids, and hinge means for attaching one end of said skids to the tops of said upstanding guides. It also comprises a pair of hydraulic elevating and support means attached to said pipe skids near said one end thereof and attached to said framework; and it comprises a pair of manual and elevating support means located near the other end of said pipe skids for determining the slope of the skids after adjustment of said hydraulic elevating and support means. It also comprises pipe evening stop means which in turn is comprised of a pair of hinged stop members located near the said one end of said pipe skids and movable into and out of the path of said lengths of pipe. In addition the pipe evening stop means comprises a common shaft for said members having said members attached for rotation therewith, a lever arm for rotating said common shaft, and a hydraulic actuator for actuating said lever arm to rotate said common shaft. The unloader additionally comprises hydraulic pressure supply means connected to said engine for providing hydraulic pressure to actuate said foregoing hydraulic means. Also, pipe evening check means comprising a hinged lever arm resiliently biased into the path of said lengths of pipe and located near the said other end of said pipe skids, and a plurality of frame jack supports carried by said framework for taking the load off of said vehicle during pipe unloading operations.

The foregoing and other objects and benefits of the invention will be more fully set forth below in connection with the best mode contemplated by the inventors of carrying out the invention, and in conection with which there are illustrations provided in the drawings, wherein:

FIGURE 1 is a perspective showing that omits much detail but illustrates the unloader in position at a dock side location with a barge therebelow and a pipe rack adjacent to the other side of the unloader;

FIGURES 2a and 2b, together, are a perspective showing of the entire unloader according to the invention;

Figure 1:
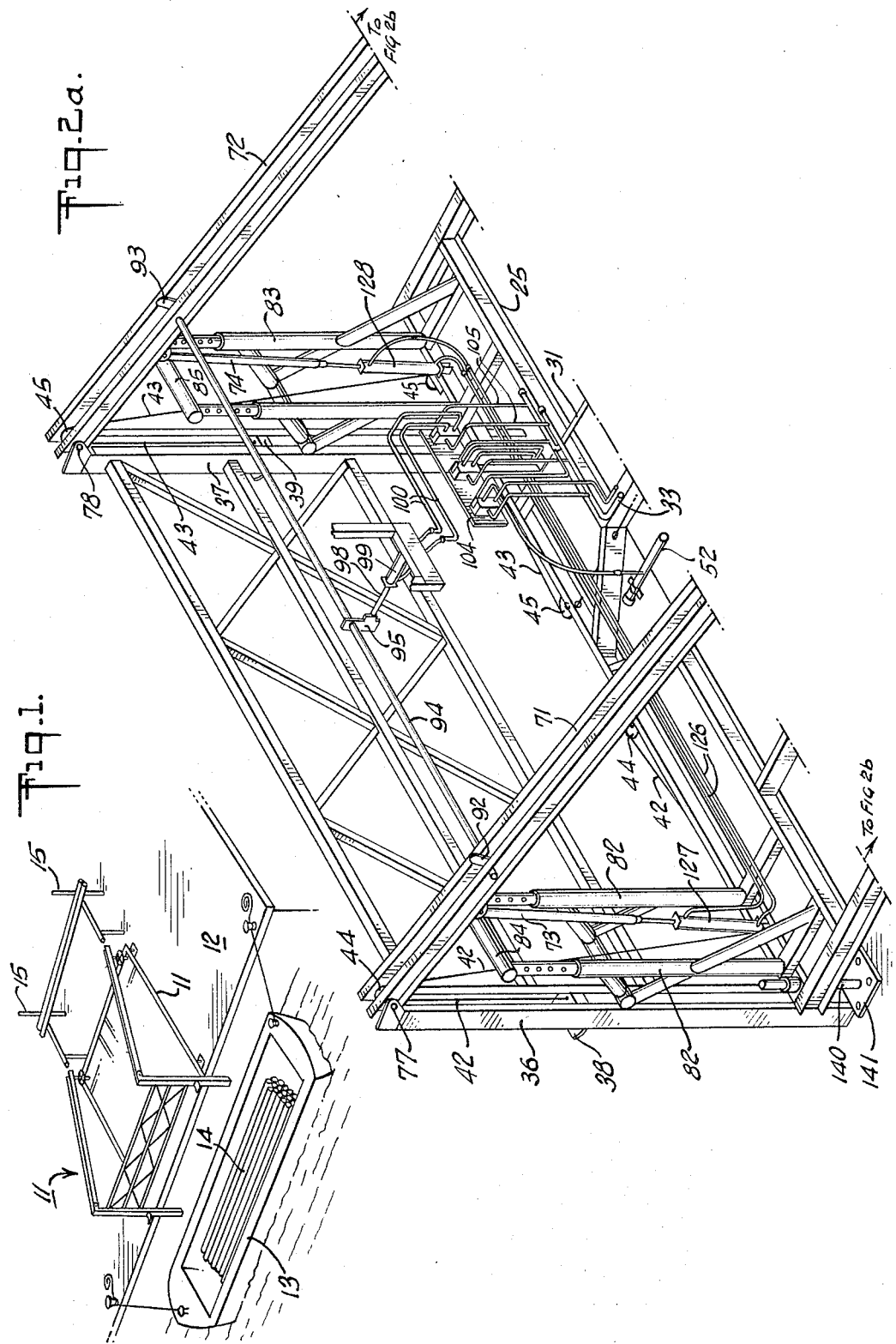

Referring to FIGURE 1, it is to be noted that the pipe unloader is shown schematically, i.e., with many of the details such as its vehicular mounting, left out. However, this illustration shows the manner in which an unloader according to this invention may be employed at the edge of a dock located above a flat bed barge containing lengths of pipe that are to be unloaded. Thus, it will be observed that for a given unloading operation of this sort, a pipe unloader 11 will be in place at the side of a dock 12 along side of which there is a flat bed type barge 13 tied up. A load of pipe lengths 14 are carried by the barge 13 and will be unloaded via the unloader 11 on to a pipe rack 15, as illustrated. It will be appreciated that some other receptacle for the unloaded pipe lengths, might be employed instead of the pipe rack 15 illustrated, e.g., if the pipe lengths are to be transported to some other location they might be loaded on to a truck or railroad car or the like.

For details of the pipe unloader structure itself, reference is made to the remaining figures of the drawings, i.e., FIGURES 2a, 2b, 3, 4 and 5. The unloader is mounted on a vehicle 20 that has a pair of steerable wheels 21 at one end of the vehicle, and a pair of power wheels 22 (only one shown) located at the other end of the vehicle. In this manner, the unloader is mobile (between operations) so that it may be readily transferred from one location to another for different unloading operations.

The unloader has a framework 25 that is suported by the vehicle 20 for moving this framework and the entire unloader, between operation, as explained above. It will be appreciated that the construction employed is such that the framework 25 is attached as an integral part of the frame for the vehicle 20. Thus, there is an engine 26 mounted on part of the framework 25. From the engine 26, there is a power driving connection to the wheels 22, which driving connection includes a differential 27 (FIG. 2b) that has its input driven by a connection (not shown) from the engine 26. It will be appreciated that the mechanical elements employed in the foregoing driving connection from engine 26 to the axies for wheels 22, may take any feasible form and do not constitute any part of the invention per se.

The engine 26 is also connected to drive a hydraulic pump (not shown) which is not in view but may be located within a compartment 30 from which there extends a hydraulic pressure line 31. Of course there will be a hydraulic fluid return to the pump within the compartment 30, from a hydraulic tank 32. This may be via a short hydraulic pipe (not shown) which connects from the compartment 30 to the tank 32. It will be appreciated that there will be also a system return hydraulic line 33, which leads from a location near a hydraulic control panel to the storage tank 32.

Figure 2:
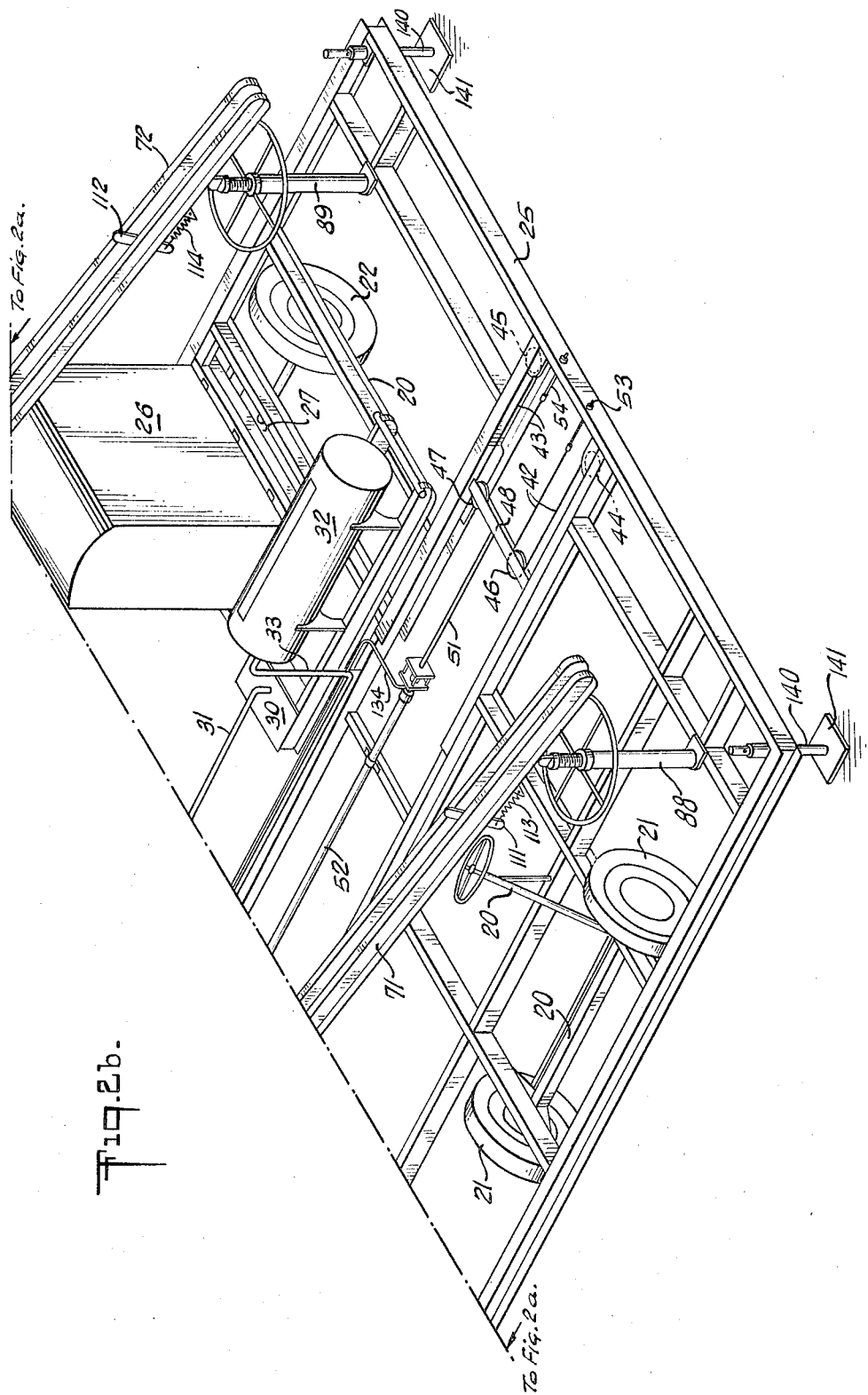

For the most complete illustration of the pipe lifting means, reference is had to FIGURE 2 (both 2a and 2b). However, some of the details thereof are more clearly illustrated in the enlargements of FIGURES 3 and 4 and in the schematic of FIGURE 5. The lifting means comprises a pair of upstanding guides 36 and 37 which act as tracks for a pair of pipe supports 38 and 39 to run therein. The pipe supports 38 and 39 are attached to the ends of a pair of cables 42 and 43 which run over a set of four directional pulleys 44 and 45, respectively, in each case. There are also a pair of pulleys 46 and 47 that are mounted on a pulley support 48. The pulley support 48 is in turn attached to the end of a shaft 51 that moves longitudinally under control of an elongated hydraulic cylinder and piston unit 52. The other ends of the cables 42 and 43 (from that attached to the pipe supports) are anchored to the framework 25 by means of anchor bolts 53 and 54, as illustrated.

Figure 4:
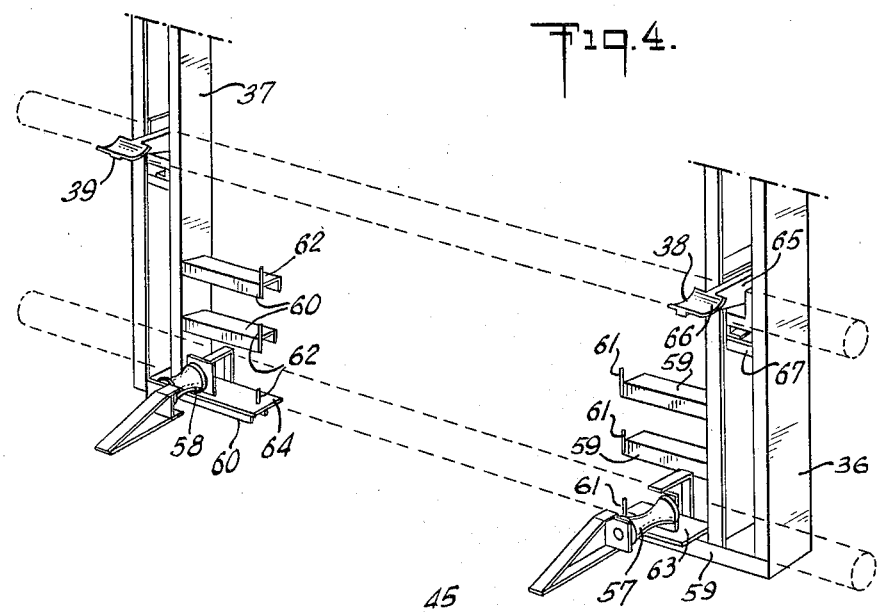
FIGURE 4 is also an enlarged detail, shown in perspective, and illustrates the structure for the pipe lifting members, as well as rollers for centering the pipe longitudinally as it is placed upon the unloader.
Figure 5:
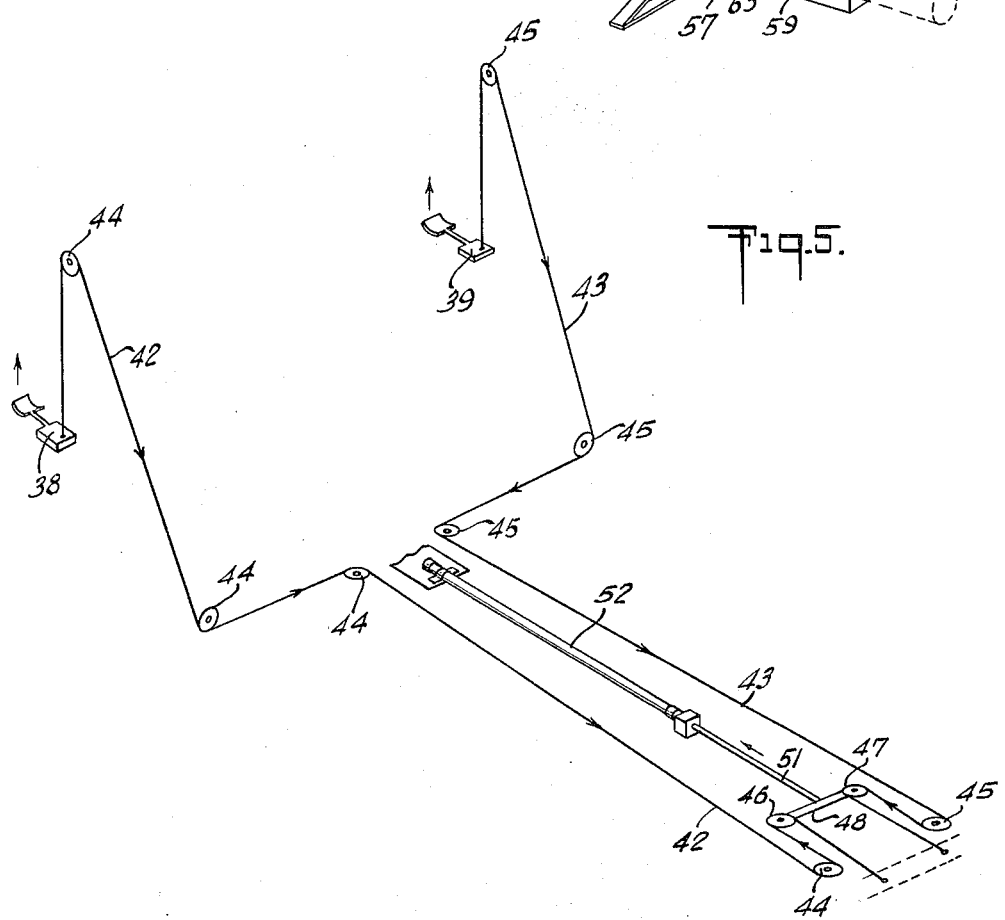
FIGURE 5 is a schematic showing, in perspective, illustrating the cables and hydraulic drive element which together provide the actuation for raising the pipe lifters in their tracks.

As illustrated clearly in FIGURE 4, there are a pair of rollers 57 and 58 that are for centering the pipe sections by moving them longitudinally as they are placed at the bottom of the lifting means, prior to the actual lift of each pipe section by the pipe supports. It will be noted that there are three supporting channels 59 attached near the bottom of guide 36. Similarly there are three supporting channels 60 attached near the bottom of the other guide 37. These supporting channels are for placing the rollers 57 and 58 at adjustable heights above the lower end of the respective guides to which they are attached. These channels 59 and 60 have pins 61 and 62 respectively welded to one corner of the channels for receiving a hole in a plate 63 and 64 respectively, that support each of the rollers 57 and 58. In this manner each roller is held in position without rotation around the pin, when it has been placed on top of any one of the supporting channels. This is accomplished by reason of a close fit by the adjacent edge of the plate against the side of the respective guide in each case.

Each of the pipe supports 38 and 39 are substantially identical and consequently only one need be described in detail. As already indicated above the guide columns 36 and 37 form tracks within which each of the pipe supports 38 and 39 may travel or slide vertically. With reference to FIGURE 4 it will be observed that pipe support 38 includes a short horizontal arm 65 which has a flat slightly curved pipe receiving surface 66 at the extremity thereof. The arm 65 is pivotally supported in a block 67 that fits in and slides vertically up and down the track formed by the two side channel members of the guide 36. The arm 65 is arranged to extend behind the pivot (as viewed in FIGURE 4) so that when the lifting takes place, and as the block 67 reaches the top of the lifting travel in the guide 36, it will strike a stop lug (not shown) that is arranged to trip the arm 65 from the horizontal position illustrated in FIGURE 4 to a substantially vertical position. This action will, of course, eject or move the pipe off from the suport surfaces, e.g., surface 66, onto the adjacent end of a pair of skids 71 and 72 which will be described in more detail hereafter.

Pipe skids 71 and 72 are supported on the framework 25 at one end of the skids by a pair of hydraulic lifters 73 and 74. These lifters are attached near that end of the skids which is adjacent to the pipe lifting means. Guide columns 36 and 37 are supported in a pivotal manner by hinge pin couplings 77 and 78 illustrated. In this manner, the vertical position or elevation of the columns (and pipe lifters thereon) may be adjusted as desired to compensate for the relative height of the barge, or other pipe containing vehicle that is being unloaded.

It will be observed that there are also manually adjustable load bearing supports 82 and 83 which each have two vertical columns that may be adjusted and held in a given position by placing pins (not shown) in any one of a series of vertical holes, illustrated, in a standard manner. The load support is accomplished by a cross bar 84 of the support 82, and by a similar cross bar 85 of the support 83. Both extend transversely beneath the corresponding pipe skid 71 and 72 respectively so that the skid may rest thereon and relieve the load from the hydraulic lifters 73 and 74 in each case.

Near the opposite end of the pipe skids 71 and 72 there is in each case a manually adjustable vertical support 88 and 89. These supports may be adjusted to raise or lower the vertical height of the free ends of the pipe skids (relative to frame 25) so as to adjust the slope of the skids during unloading operations.

There is a "pipe evening" stop arrangement near the upper end (where lifter guides 36 and 37 are attached) of the pipe skids. This acts to catch the pipe after it has first been ejected from the lifting means, and insure that it is even (transverse at ninety degrees) across the skids. This pipe evening stop means comprises a pair of lugs, or short pivotal arms 92 and 93. These are securely attached to a shaft 94 which is pivotally received in and supported near its ends by the pipe skids 71 and 72. Near the center of the shaft 94 there is a lever arm 95 that is also securely attached to the shaft 94 for causing rotation thereof as the lever arm is pivoted. For pivoting the lever arm 95 there is a piston rod or shaft 98 that is pivotally connected to the arm 95 as shown most clearly in FIGURE 3. The piston rod 98 is moved longitudinally by hydraulic action involving a cooperating cylinder 99 which of course has a piston (not shown) therein that is hydraulically positioned longitudinally within the cylinder 99, under control of hydraulic fluid introduced over a pair of hydraulic lines 100.

Figure 3:
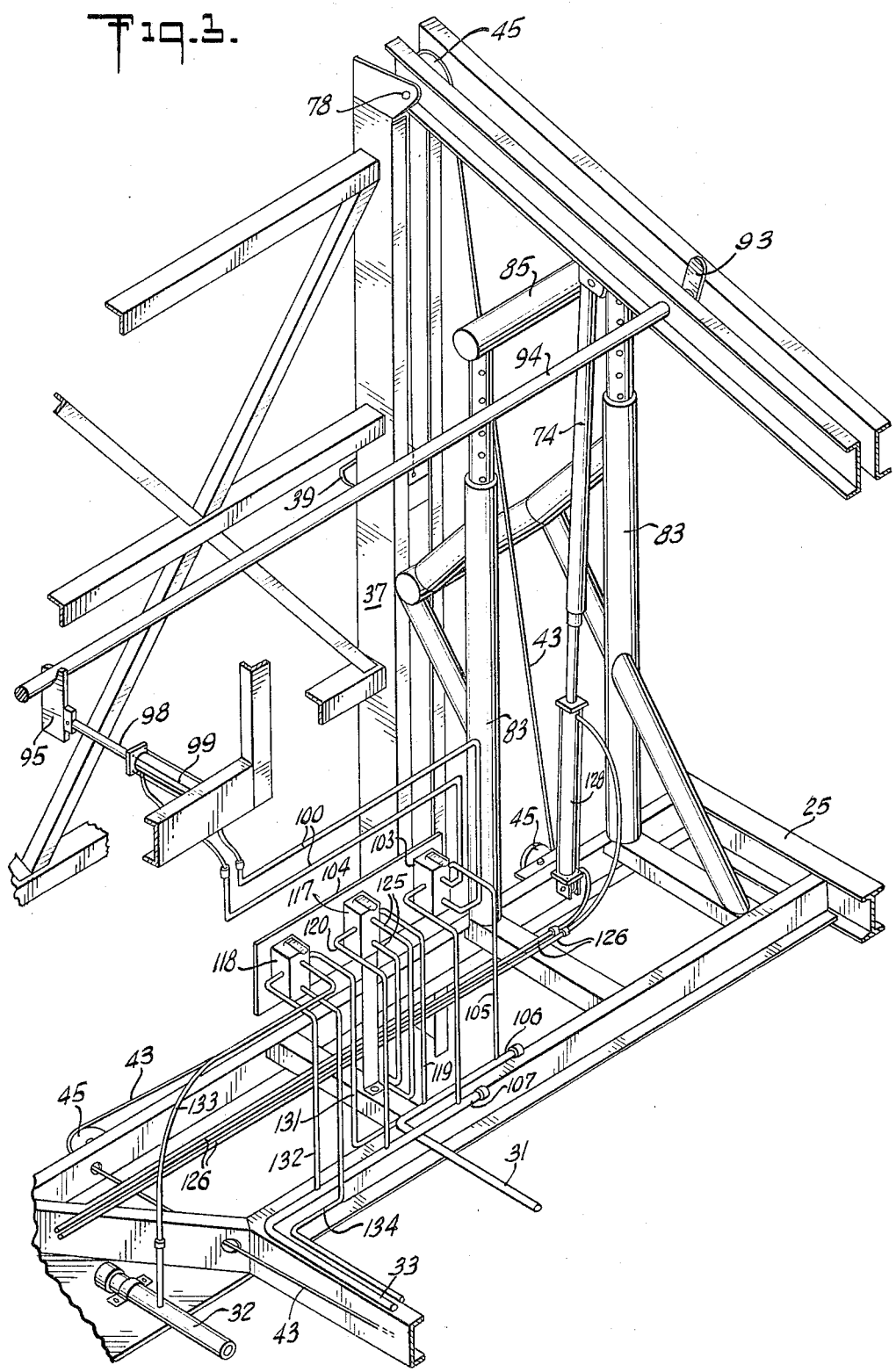
FIGURE 3 is an enlarged detail, shown in perspective, illustrating the hydraulic control panel and surrounding structure of the unloader.

The hydraulic lines 100 have the flow of hydraulic fluid therethrough controlled by a control valve 103 that is mounted on a control panel 104, as clearly illustrated in FIGURE 3. Hydraulic fluid is introduced to the valve 103 via a pair of hydraulic input lines 105, which in turn connect to a pair of manifolds for hydraulic fluid pressure and return 106 and 107 respectively. It will be observed that the manifold 106 is connected to pressure pipe 31 while manifold 107 is connected to the return line 33 for hydraulic fluid.

It will be observed that there are a pair of pipe evening checks 111 and 112 that are made up of short, hinged or pivoted arms located near the free ends of the pipe skids 71 and 72. Each of these pivoted arms 111 and 112 are resiliently biased into an upstanding position extending into the path of the lengths of pipe as they roll down the skids. Such resilient bias is accomplished by means of coil springs 113 and 114 for the pipe checks 111 and 112 respectively.

The total hydraulic system includes three separately controllable hydraulic elements which are all controllable from a central location. Thus there is the panel 104 which has the control valve 103 mounted thereon. In addition, the panel 104 also carries control valves 117 and 118, which control respectively the operation of the hydraulic lifters 73 and 74, in the one instance, and the hydraulic actuating cylinder and piston 52 for the pipe lifting supports 38 and 39 (which travel in the upstanding guides) in the other instance.

It will be observed that there are a pair of input hydraulic lines 119 and 120 to the valve 117, which connect from the hydraulic manifolds 106 and 107 respectively. The output hydraulic connections from valve 117 go via a pair of hydraulic lines 125 to a pair of horizontally extending hydraulic lines 126 that reach across the framework and are connected to the ends of cylinders 127 and 128 which actuate hydraulic lifters 73 and 74 respectively. Likewise, the control valve 118 has a pair of hydraulic input lines 131 and 132 connected from the manifolds 106 and 107 respectively, while a pair of hydraulic output lines 133 and 134 run from the valve to the ends of the hydraulic cylinder and piston unit 52.

It will be observed also that there are located at each of the four corners of the framework 25 a frame jack 140 which may take any feasible form and includes a flat plate 141 at the base thereof to provide adequate support on the ground. It may be noted that these jacks are employed to relieve some of the weight from the vehicle and to steady the framework during unloading operations.

OPERATION

In order to clarify the cooperative actions of the various elements, a cycle of unloading operation involving one pipe section being lifted and carried down the skids, will be described.

With general reference to FIGURE 1 (for the total interrelationship of elements and the unloading operations), and first of all with particular reference to FIGURE 4, it will be noted that the first step required is that of placing a section of pipe 14 onto the rollers 57 and 58. The rollers 57 and 58 will have been placed in position at the bottom end of the vertical guides 36 and 37, e.g., by being set onto channels 59 and 60 in the manner illustrated in FIGURE 4.

It will be appreciated that before pipe is placed on the rollers 57 and 58 the pipe supports 38 and 39 will have been lowered to the bottom of the tracks so that they will lie beneath the horizontal level of the supporting surface of rollers 57 and 58. Then when a pipe section is on the rollers, it may be shifted longitudinally to center the pipe relative to the guides 36 and 37. Next, the hydraulic control valve 118 will be actuated to cause the cylinder and piston unit 52 to draw shaft 51 back in a retracting manner and thus move the pulley support bar 48 and consequently cause the pulleys 46 and 47 to effectively shorten the cables at the free ends thereof. This cable shortening will, of course, pull the pipe supports 38 and 39 upward within their tracks and elevate the pipe therewith.

When the pipe and pipe supports carrying same reach the top of the guides 36 and 37, there will be the ejecting action described above in connection with the pipe support structure. In other words at the top of the travel of the pipe supports 38 and 39, the arms (e.g. arm 65) will pivot upward into a vertical position and the pipe will thus roll off onto the upper end of the pipe skids 71 and 72. The control valve for the pipe supports may then be reversed so as to lower them back down to the bottom of their tracks ready for receipt of another pipe.

In the meantime the ejected pipe will roll down the pipe skids until it reaches the lugs 92 and 93 which act to arrest its travel and insure that it is equalized or set at right angles for completing its travel down the skids without rolling off to one side. Following this "pipe evening" stop action, the control valve 103 will be actuated so as to extend the piston rod 98 and cause rotation of the shaft 94 along with the lugs 92 and 93. Such rotation will be in a direction such that they will release the pipe and allow it to continue to roll down the pipe skids.

Shortly before the pipe reaches the end of the pipe skids 71 and 72, it will contact the pair of pipe evening checks 111 and 112. These checks are designed to act so as to again straighten the pipe, by the frictional resistance offered by the checks, in case the pipe is uneven at this point. Finally, the pipe will roll off the ends of the pipe skids and onto a pipe rack or whatever arrangement has been made for receiving the unloaded pipe sections as they complete their travel over the unloader.

While a particular embodiment of the invention has been described in some detail and in accordance with the applicable statutes, this is not to be taken as in any way limiting the invention, but merely as being descriptive thereof.

We claim:
1. A vehicular type pipe unloader for transferring lengths of pipe from a relatively low level that is variable to an elevated rack for receiving same, comprising in combination a vehicle having wheels thereon,
a framework mounted on said vehicle,
an engine carried by said framework,
power transmitting means for connecting said engine to said wheels,
pipe lifting means carried by said framework, comprising
    a pair of upstanding guides supported from said framework,
    a pair of pipe supports traveling in said guides,
    a pair of cables attached to said pipe supports for raising same in said guides,
    a plurality of pulleys for determining the paths of said cables,
    a pulley support for two of said pulleys, and
    hydraulic cylinder means for moving said pulley support to increase the path lengths for said cables and thus raise said pipe supports,
a pair of pipe skids,
hinge means for attaching one end of said skids to the tops of said upstanding guides,
a pair of hydraulic elevating and support means attached to said pipe skids near said one end thereof and attached to said framework,
a pair of manual elevating and support means located near the other end of said pipe skids for determining the slope of the skids after adjustment of said hydraulic elevating and support means,
pipe evening stop means comprising
    a pair of hinged stop members located near the said one end of said pipe skids and movable into and out of the path of said lengths of pipe,
    a common shaft for said members having said members attached for rotation therewith,
    a lever arm for rotating said common shaft, and
    a hydraulic actuator for actuating said lever arm to rotate said common shaft,
hydraulic pressure supply means connected to said engine for providing hydraulic pressure to actuate said foregoing hydraulic means,
pipe evening check means comprising a hinged lever arm resiliently biased into the path of said lengths of pipe and located near the said other end of each of said pipe skids, and
a plurality of frame jack supports carried by said framework for taking the load off of said vehicle during pipe unloading operations.

2. A vehicular type pipe unloader according to claim 1 further including a pair of manually adjustable load bearing supports located adjacent to said hydraulic elevating and support means near one end of said pipe skids.

3. A vehicular type pipe unloader for transferring lengths of pipe from a relatively low level to an elevated support therefor, comprising in combination,
- a framework mounted on a vehicular base for providing mobility to said unloader,
- pipe lifting means carried by said framework and comprising a pair of spaced vertically movable support members,
- hydraulic means for adjusting said pipe lifting means vertically relative to said framework,
- a pair of pipe skids carried by said framework and cooperating with said pipe lifting means to receive said lengths of pipe from the top of the vertical movement of said lifting means, and
- manual adjusting means for said skids to regulate the height thereof relative to said framework at the other end of the skids from said pipe lifting means.

4. A vehicular type pipe unloader for transferring lengths of pipe from a relatively low level to an elevated support therefor, comprising in combination,
- a framework mounted on a vehicular base for providing mobility to said unloader,
- an engine carried by said framework,
- pipe lifting means carried by said framework and comprising a pair of spaced vertically movable support members,
- hydraulic means for actuating said pipe lifting means, means for connecting said engine to said vehicular base to provide power therefor,
- hydraulic pressure supply means connected to said engine for providing hydraulic pressure to actuate said first named hydraulic means,
- a pair of pipe skids carried by said framework and cooperating with said pipe lifting means to receive said lengths of pipe from the top of the vertical movement of said lifting means,
- pipe evening stop means for arresting said lengths of pipe near the top of said skids in order to aline the pipe at right angles to said skids,
- a hydraulic actuator for said stop means to release said pipe when even and means for connecting said hydraulic pressure thereto,
- said pipe lifting means also comprising a pair of upstanding guides pivotally supported at one end of said pipe skids.

5. A pipe unloader according to claim 4 further including means for adjusting the vertical position of said upstanding guides.

6. A pipe unloader according to claim 5 wherein said further included adjusting means comprises hydraulic elevators in addition to manual load bearing supports for said pipe skids near the end which supports said guides.

References Cited by the Examiner

UNITED STATES PATENTS

| | | | |
|---|---|---|---|
| 2,194,125 | 3/1940 | Rinehart | 214—95 |
| 2,207,053 | 7/1940 | Fivecoate | 187—11 |
| 2,480,392 | 8/1949 | Alves | 214—75 X |
| 2,617,547 | 11/1952 | Pridy | 214—1 |
| 2,780,376 | 2/1957 | Sanders | 214—519 |
| 2,900,091 | 8/1959 | Minter | 214—2.5 |

FOREIGN PATENTS

| | | |
|---|---|---|
| 613,885 | 2/1961 | Canada. |
| 1,348,597 | 12/1963 | France. |

MARVIN A. CHAMPION, *Primary Examiner.*